(Model.)
C. WREN.
DRILL SUPPORT.
No. 263,008. Patented Aug. 22, 1882.
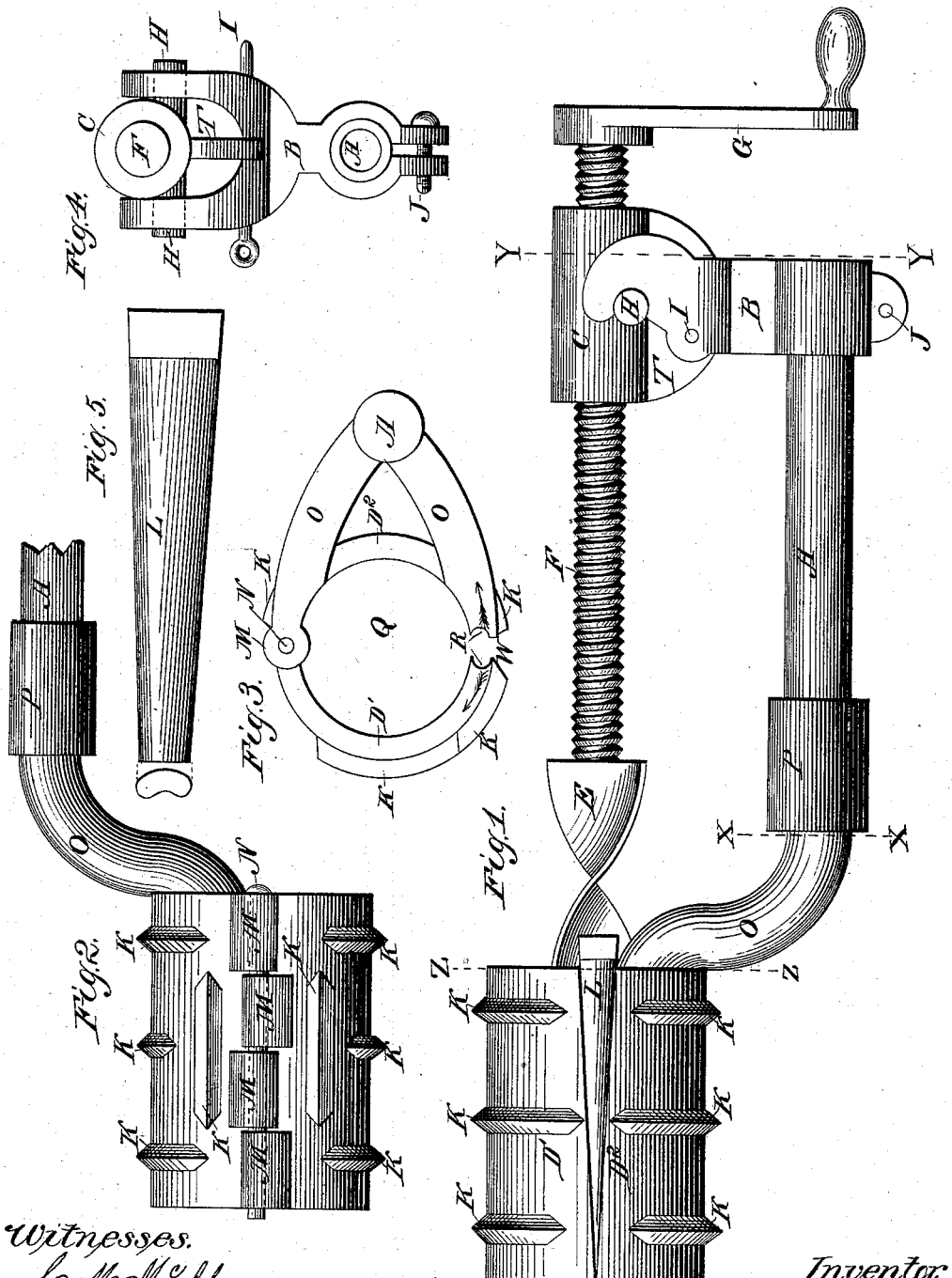
Witnesses.
C. W. McManus
Jno. F. Beacham
Inventor.
Christopher Wren

UNITED STATES PATENT OFFICE.

CHRISTOPHER WREN, OF PLYMOUTH, PENNSYLVANIA.

DRILL-SUPPORT.

SPECIFICATION forming part of Letters Patent No. 263,008, dated August 22, 1882.

Application filed May 27, 1882. (Model.)

*To all whom it may concern:*

Be it known that I, CHRISTOPHER WREN, of Plymouth, in the county of Luzerne and State of Pennsylvania, have invented a new and Improved Drilling-Machine, of which the following is a specification, reference being had to the accompanying drawings.

Figure 1 is a side view, showing the parts in position for operation. Fig. 2 is also a side view. Fig. 3 is an end view on the broken lines Z Z and X X, Fig. 1. Fig. 4 is an end view on the line Y Y, Fig. 1. Fig. 5 is the wedge L, side and end views.

Similar letters refer to similar parts in all the views.

A is a hollow arm attached to O O by the coupling P.

B is a movable box split on one side, and clamped to arm A by the screw J, having seats in it for the trunnions H H, and a small hole, J, which registers with holes of like size in flange T, that a pin or key may pass through them.

C is a threaded box resting on the trunnions H H in box B, and having on its under side a semicircular flange, T, in which are holes that register with the hole I in box B.

$D'$ $D^2$ form an expansible tube, which may be made either straight or tapering, split lengthwise, fastened together on one side by the pin N, running through the hinges M M M M, and separated on the other side by a tapered opening, W, in which are grooves R R, made to fit the edge of the wedge L, having on their outer surface raised sharp-edged ribs K K K K, &c., and having on one end forked arms O O, which fit into the coupling P.

E is a twisted drill.

F is a plain screw working through the threaded box C, made on the ends to fit the sockets in crank G and drill E.

L is a tapered wedge sliding in the grooves R R, and concaved, so as to throw the strain in the direction indicated by the arrows in Fig. 3, being the point of greatest strength of metal.

Q is the space, formed by $D'$ $D^2$, through which the drill passes into the coal or other substance.

Operation: The parts $D'$ $D^2$ are placed in a hole which has been made, by hand-drill or otherwise, large enough to admit them when closed. The wedge L is then placed in the grooves R R and driven forward into the opening W. This expands the parts $D'$ $D^2$ and forces the sharp-edged ribs K K K K, &c., into the surrounding coal or other substance. The machine is thus held firmly to its place. In the operation of drilling the screw F is turned in the threaded box C by means of the crank G. The thread in the box C feeds the screw F and the drill E, which is attached to screw F, forward into the substance being drilled. When the screw F has been fed forward as far as it will go the pin I is taken out, the trunnions H H are uncoupled, and the screw F is turned end for end. It is then ready to start forward again. In case it is desirable to drill a hole outside of the space Q, it may be done by changing the pin I to another hole in the flange F, or by loosening the screw J and dropping the box B sidewise. This gives the machine a range anywhere in a circle of which the arm A is the center.

I am aware that prior to my invention drilling-machines have been in use made with the twisted drill E and the screw F, operated by a crank, G. I therefore do not claim these parts, broadly; but

What I claim as new is—

1. The combination, in a drilling-machine fastening, of the expansible tube $D'$ $D^2$, of which the hinges M M M M, the pin N, the sharp-edged ribs K K K K, &c., the tapered opening W, and the grooves R R are component parts, with a tapered wedge, L, substantially as arranged and described.

2. The combination, in a drilling-machine, of the expansible tube $D'$ $D^2$, the wedge L, and the hollow arm A with the adjustable box B and the flanged threaded box C, all substantially as described and set forth.

CHRISTOPHER WREN.

Witnesses:
C. W. MCALARNEY,
HORATIO M. COLE.